US010421839B2

(12) United States Patent
Ando

(10) Patent No.: US 10,421,839 B2
(45) Date of Patent: Sep. 24, 2019

(54) AMINOALKYL GROUP-CONTAINING SILOXANE AND A METHOD FOR PREPARING THE SAME

(71) Applicant: Shin-Etsu Chemical Co., Ltd., Tokyo (JP)

(72) Inventor: Yuji Ando, Annaka (JP)

(73) Assignee: SHIN-ETSU CHEMICAL CO., LTD., Tokyo (JP)

(*) Notice: Subject to any disclaimer, the term of this patent is extended or adjusted under 35 U.S.C. 154(b) by 0 days.

(21) Appl. No.: 15/639,693

(22) Filed: Jun. 30, 2017

(65) Prior Publication Data

US 2018/0002489 A1    Jan. 4, 2018

(30) Foreign Application Priority Data

Jul. 1, 2016    (JP) .................. 2016-131317

(51) Int. Cl.
| | |
|---|---|
| C08G 77/26 | (2006.01) |
| C08G 77/46 | (2006.01) |
| C08G 77/08 | (2006.01) |
| C08G 77/06 | (2006.01) |
| C08G 77/14 | (2006.01) |
| C08G 77/388 | (2006.01) |
| C08L 83/04 | (2006.01) |
| C08G 77/20 | (2006.01) |

(52) U.S. Cl.
CPC ............. *C08G 77/26* (2013.01); *C08G 77/06* (2013.01); *C08G 77/08* (2013.01); *C08G 77/14* (2013.01); *C08G 77/388* (2013.01); *C08G 77/46* (2013.01); *C08L 83/04* (2013.01); *C08G 77/20* (2013.01)

(58) Field of Classification Search
CPC ....................................................... C08G 77/26
See application file for complete search history.

(56) References Cited

U.S. PATENT DOCUMENTS

| | | | | |
|---|---|---|---|---|
| 5,075,403 | A | * 12/1991 | Kirk | .................. B01D 19/0409 528/15 |
| 5,147,578 | A | 9/1992 | Kirk | |
| 5,262,088 | A | * 11/1993 | Hill | .................. B01D 19/0409 510/343 |
| 2002/0114771 | A1 | * 8/2002 | Nakanishi | .............. A61K 8/891 424/70.12 |
| 2004/0003473 | A1 | * 1/2004 | Glenn | .................. A61K 8/898 8/405 |
| 2006/0280716 | A1 | * 12/2006 | Czech | .................. A61K 8/898 424/70.122 |
| 2008/0139731 | A1 | * 6/2008 | Lawson | ................ C08L 83/04 524/447 |
| 2009/0012257 | A1 | 1/2009 | John et al. | |
| 2010/0280148 | A1 | 11/2010 | Webster et al. | |
| 2016/0177037 | A1 | * 6/2016 | Huggins | ............... C08G 77/26 525/436 |
| 2017/0172901 | A1 | * 6/2017 | Kerl | ...................... A61Q 5/10 |

FOREIGN PATENT DOCUMENTS

| | | | |
|---|---|---|---|
| JP | 3-95228 | A | 4/1991 |
| JP | 5-81609 | B2 | 11/1993 |
| JP | 10-17578 | A | 1/1998 |
| JP | 10-218883 | * | 8/1998 |
| JP | 2008-536957 | A | 9/2008 |
| JP | 2016-74831 | A | 5/2016 |
| WO | WO 2016/037803 | * | 3/2016 |

OTHER PUBLICATIONS

"Preparation of 3-Triethoxysilylpropylamine and 1,3-Bis(3-anninpropyl)tetrannethyldisiloxane" authored by Saam et al. and published in the Journal of Organic Chemistry (1959) 119-120.*
Machine translation of JP 10-218883 (no date).*

* cited by examiner

*Primary Examiner* — Marc S Zimmer
(74) *Attorney, Agent, or Firm* — Birch, Stewart, Kolasch & Birch, LLP

(57) ABSTRACT

One of the purposes of the present invention is to provide an aminoalkyl group-containing siloxane, in particular an aminoalkyl group- and polyoxyalkylene group-containing siloxane, in which an amount of a cyclic siloxane as an impurity contained is decreased, and a method for preparing the same. The present invention is to provide a method for preparing an aminoalkyl group-containing siloxane represented by the following general formula (1): $(R^1{}_3SiO_{1/2})_k(R^1{}_2SiO_{2/2})_p(R^1{}_1SiO_{3/2})_q(SiO_{4/2})_r$ (1), wherein $R^1$ is, independently of each other, a hydroxyl group, an alkoxyl group, a substituted or unsubstituted monovalent hydrocarbon group having 1 to 20 carbon atoms, or a group represented by the following formula (2), (3) or (6); $-(CR^2H)_a-(NHCH_2CH_2)_b-NH_2$ (2), $-(CR^2H)_c-O-(C_2H_4O)_d-(C_3H_6O)_e-R^3$ (3), $-(CR^2H)_f-(R^5{}_2SiO)_s-SiR^5{}_3$ (6); provided that at least one of $R^1$ is the group represented by the formula (2); comprising a step of addition reacting (A) a hydrogensiloxane represented by the following general formula (9): $(R^8{}_3SiO_{1/2})_k(R^8{}_2SiO_{2/2})_p(R^8{}_1SiO_{3/2})_q(SiO_{4/2})_r$ (9) with (B) a compound represented by the following formula (10) and having a protected amino group: $CHR^2=CR^2-(CR^2H)_a-(NQCH_2CH_2)_b-NQ_2$ (10) and optionally (C) a polyether represented by the following formula (11): $CHR^2=CR^2-(CR^2H)_c-O-(C_2H_4O)_d-(C_3H_6O)_e-R^3$ (11) and (D) a (poly)siloxane represented by the following formula (12): $CHR^2=CR^2-(CR^2H)_f-(R^5{}_2SiO)_s-SiR^5{}_3$ (12); and a step of removing the silyl group from the amino group, hereinafter referred to as deprotection, to thereby provide said aminoalkyl group-containing siloxane represented by the formula (1).

12 Claims, No Drawings

AMINOALKYL GROUP-CONTAINING SILOXANE AND A METHOD FOR PREPARING THE SAME

CROSS REFERENCE

This application claims the benefits of Japanese Patent Application No. 2016-131317 filed on Jul. 1, 2016, the contents of which are herein incorporated by reference.

FIELD OF THE INVENTION

The present invention relates to an aminoalkyl group-containing siloxane and a method for preparing the same. Specifically, according to the method, an amount of a cyclic siloxane as an impurity contained in the aminoalkyl group-containing siloxane is decreased to thus give an aminoalkyl group-containing siloxane with the decreased amount of a cyclic siloxane contained. Further, the present invention relates to an aminoalkyl group- and polyoxyalkylene group-containing siloxane and a method for preparing the same.

An aminoalkyl group- and polyoxyalkylene group-containing polyorganosiloxane is known as a compound which is usable in hair care compositions, cosmetic compositions and detergent compositions. Japanese Examined Patent Publication No. Hei5-81609, patent literature 1, describes a method wherein hydrogenpolydiorganosiloxane addition is reacted with an allylamine and subsequently the remaining SiH group is addition reacted with an allyl group-containing polyether compound to prepare an amino group- and polyoxyalkylene group-containing polyorganosiloxane. Japanese National Phase Publication No. 2008-536957, patent literature 2, describes a method for preparing an aminoalkyl group-containing siloxane or an aminoalkyl group- and polyoxyalkylene group-containing siloxane by equilibration of a polyether-modified siloxane, an octamethylcyclotetrasiloxane, and a hydrolysis product of 3-aminopropylmethyldimethoxysilane in the presence of a KOH catalyst.

PRIOR LITERATURES

Patent Literatures

[Patent Literature 1] Japanese Examined Patent Publication No. Hei5-81609
[Patent Literature 2] Japanese National Phase Publication No. 2008-536957

DISCLOSURE OF THE INVENTION

Problems to be Solved by the Invention

However, when an alkenyl group-having amino compound such as the allyl amine described in patent literature 1 is used, problems occurs such that the amino group prevents an action of an addition reaction catalyst such as platinum catalyst and, thereby, unreacted hydrosilyl group remains in a product, or that a dehydrogenation reaction occurs between the amino group and the hydrosilyl group and, thereby, a silazane generates and a purity of a product is decreased. In the method by the equilibration as described in patent literature 2, when the terminal of the polyether group is a hydroxyl group, an alkoxylsilyl group generates in the equilibration. Therefore, the terminal of the polyether needs to be blocked by an alkyl group or the like, so that an attainable structure of an aminoalkyl group- and polyoxyalkylene group-containing siloxane is limited. Further, many steps of preparation are needed to prepare a polyether-modified siloxane, starting material in the equilibration, so that productivity is low. Further, cyclic siloxanes such as hexamethylcyclotrisiloxane and octamethylcyclotetrasiloxane and a cyclic siloxane having an aminoalkyl group generate.

Therefore, an aminoalkyl group-containing siloxane, in particular an aminoalkyl group- and polyoxyalkylene group-containing siloxane, which has no hydrosilyl group, no alkoxysilyl group and no cyclic siloxane and has a high purity is very required. Additionally, a method is also very required, wherein the attainable structure of an aminoalkyl group- and polyoxyalkylene group-containing siloxane is not limited, the siloxane can be prepared in only via an addition reaction, the addition reaction is not disturbed, and no unreacted hydrosilyl group remains in the product siloxane.

One of the purposes of the present invention is to provide an aminoalkyl group-containing siloxane, in particular an aminoalkyl group- and polyoxyalkylene group-containing siloxane, in which an amount of a cyclic siloxane as an impurity contained is decreased, and a method for preparing the same. Further, another purpose of the present invention is to provide a method for preparing an aminoalkyl group- and polyoxyalkylene group-containing siloxane wherein the attainable structure of an aminoalkyl group- and polyoxyalkylene group-containing siloxane is not limited, the siloxane can be prepared in only via an addition reaction process, the addition reaction is not disturbed, and no unreacted hydrosilyl group remains in the siloxane obtained. In particular, the purpose of the present invention is to provide a method such that the addition reaction can proceed sufficiently and an unreacted hydrosilyl group does not remain, even with a small amount of a catalyst.

Means to Solve the Problems

To solve the aforesaid problems, the present inventor has made research and found that the aforesaid problems are solved by a method for preparing an aminoalkyl group-containing siloxane, comprising a step of addition reacting a hydrogen siloxane represented by the following formula (A) and a compound having a protected amino group and unsaturated group, represented by the following formula (B) and, then, a step of removing the protecting group from the amine, deprotection. In particular, on account of the use of a compound having an amino group protected by a silyl group, represented by the following formula (B), the addition reaction is not prevent by the amino group and the addition reaction proceeds sufficiently, even with a small amount of catalyst.

Thus, the present invention is to provide a method for preparing an aminoalkyl group-containing siloxane represented by the following general formula (1):

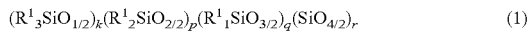
$$(R^1{}_3SiO_{1/2})_k(R^1{}_2SiO_{2/2})_p(R^1{}_1SiO_{3/2})_q(SiO_{4/2})_r \quad (1)$$

wherein $R^1$ is, independently of each other, a hydroxyl group, an alkoxyl group, a substituted or unsubstituted monovalent hydrocarbon group having 1 to 20 carbon atoms, or a group represented by the following formula (2), (3) or (6), provided that at least one of $R^1$ is the group represented by the following formula (2), k, p, q and r are, independently of each other, an integer of 0 or more, provided that a total of k, p, q and r is larger than zero, and a bonding order of the parenthesized siloxane units is not limited;

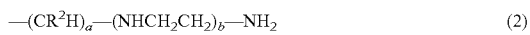
$$-(CR^2H)_a-(NHCH_2CH_2)_b-NH_2 \quad (2)$$

wherein a is an integer of from 2 to 11, b is an integer of from 0 to 10, and $R^2$ is, independently of each other, a hydrogen atom or an unsubstituted monovalent hydrocarbon group having 1 to 20 carbon atoms;

$$(CR^2H)_c\!-\!O\!-\!(C_2H_4O)_d\!-\!(C_3H_6O)_e\!-\!R^3 \tag{3}$$

wherein c is an integer of from 2 to 11, d is an integer of from 0 to 100, e is an integer of from 0 to 100, a total of d and e is larger than zero, $R^2$ is as defined above, $R^3$ is an unsubstituted monovalent hydrocarbon group having 1 to 20 carbon atoms, a hydrogen atom or $-\!COR^4$, wherein $R^4$ is an unsubstituted monovalent hydrocarbon group having 1 to 20 carbon atoms;

$$-\!(CR^2H)_f\!-\!(R^5{}_2SiO)_s\!-\!SiR^5{}_3 \tag{6}$$

wherein $R^5$ is, independently of each other, a hydroxyl group, an alkoxyl group or a substituted or unsubstituted monovalent hydrocarbon group having 1 to 20 carbon atoms, $R^2$ is as defined above, f is an integer of from 2 to 11, and s is an integer of from 0 to 1000;

comprising a step of addition reacting the following compound (A) with the following compound (B) and optionally the following compound (C) and/or (D), (A) a hydrogensiloxane represented by the following general formula (9):

$$(R^8{}_3SiO_{1/2})_k(R^8{}_2SiO_{2/2})_p(R^8{}_1SiO_{3/2})_q(SiO_{4/2})_r \tag{9}$$

wherein $R^8$ is, independently of each other, a hydrogen atom, a hydroxyl group, an alkoxyl group, or a substituted or unsubstituted monovalent hydrocarbon group having 1 to 20 carbon atoms, provided that at least one of $R^8$ is a hydrogen atom, k, p, q and r are as defined above and a bonding order of the parenthesized siloxane units is not limited;

(B) a compound represented by the following formula (10) and having a protected amino group:

$$CHR^2\!=\!CR^2\!-\!(CR^2H)_{a'}\!-\!(NQCH_2CH_2)_b\!-\!NQ_2 \tag{10}$$

wherein a' is "a" minus 2, b and $R^2$ are as defined above, Q is a silyl group represented by $-\!SiR^9{}_3$, wherein $R^9$ is, independently of each other, an unsubstituted monovalent hydrocarbon group having 1 to 20 carbon atoms;

(C) a polyether represented by the following formula (11):

$$CHR^2\!=\!CR^2\!-\!(CR^2H)_{c'}\!-\!O\!-\!(C_2H_4O)_d\!-\!(C_3H_6O)_e\!-\!R^3 \tag{11}$$

wherein c' is c minus 2 and d, e, $R^2$ and $R^3$ are as defined above, (D) a (poly)siloxane represented by the following formula (12):

$$CHR^2\!=\!CR^2\!-\!(CR^2H)_{f'}\!-\!(R^5{}_2SiO)_s\!-\!SiR^5{}_3 \tag{12}$$

wherein f' is f minus 2 and $R^2$, $R^5$ and s are as defined above, and, then a step of removing the silyl group from the amino group, hereinafter referred to as deprotection, to thereby provide said aminoalkyl group-containing siloxane represented by the formula (1).

The present invention further provides the aminoalkyl group-containing siloxane represented by the formula (1), wherein an amount of a cyclic siloxane represented by the following formula (4):

$$(SiBMeO)_m(SiMe_2O)_n \tag{4}$$

wherein m is an integer of from 0 to 4, n is an integer of from 3 to 20 and B is the group represented by the aforesaid formula (2), as an impurity in the aminoalkyl group-containing siloxane is 0 to 1 part by mass, relative to 100 parts by mass of the aminoalkyl group-containing siloxane.

In the present method, an amount of a cyclic siloxane represented by the following formula (8):

$$(SiHMeO)_m(SiMe_2O)_n \tag{8}$$

wherein m is an integer of from 0 to 4 and n is an integer of from 3 to 20, as an impurity contained in hydrogensiloxane (A) to be subjected to the addition reaction is preferably 0 to 1 part by mass, relative to 100 parts by mass of the hydrogensiloxane.

On account of the use of the aforesaid hydrogensiloxane as a starting material, an amount of the cyclic siloxane as an impurity contained in the aminoalkyl group-containing siloxane, such as hexamethylcyclotrisiloxane, octamethylcyclotetrasiloxane and a cyclic siloxane having an aminoalkyl group, is further decreased.

The present invention further provides a method to prepare an aminoalkyl group-containing siloxane having a remaining metal catalyst in an amount such that an amount of a metal atom is 200 ppm or less, i.e. 0.02 part by mass or less, relative to 100 parts by mass of the aminoalkyl group-containing siloxane.

Further, present invention further provides a method to prepare an aminoalkyl group-containing siloxane which contains substantively no starting material and substantively no by-product, particularly hydrosilyl group-containing compounds.

The present invention further provides a method to prepare an aminoalkyl group-containing siloxane wherein each amount of one or more kinds of cyclic siloxanes is 0 to 0.1 part by mass, relative to 100 parts by mass of the aminoalkyl group-containing siloxane.

Effects of the Invention

The present method provides an aminoalkyl group-containing siloxane, in particular an aminoalkyl group- and polyoxyalkylene group-containing siloxane, having a high purity. Specifically, according to the present method, the amount of cyclic siloxanes such as hexamethylcyclotrisiloxane and octamethylcyclotetrasiloxane and a cyclic siloxane having an aminoalkyl group, which are contained as an impurity in the product siloxane, is decreased.

On account of the use of the compound having a protected amino group as a starting material, substantively no silazane generates in the addition reaction. The addition reaction is not prevented by the amino group, even when an amount of the catalyst is small such as, for instance, 0.02 part by mass of a metal, relative to the starting hydrogensiloxane, the desired product is obtained with no remaining unreacted hydrosilyl group. In the present method, the terminal of a polyether compound to be subjected to the addition reaction may not be capped with an alkyl group and may be a hydroxyl group. Therefore, an aminoalkyl group- and polyoxyalkylene group-containing siloxane having a polyether chain having a hydroxyl group at the terminal is prepared. Further, according to the present method, the number of the production steps is less and, therefore, the productivity is improved.

BEST MODE OF THE INVENTION

The present invention provides an aminoalkyl group-containing siloxane represented by the following general formula (1).

$$(R^1{}_3SiO_{1/2})_k(R^1{}_2SiO_{2/2})_p(R^1{}_1SiO_{3/2})_q(SiO_{4/2})_r \quad (1)$$

In the formula (1), k, p, q and r are, independently of each other, an integer of 0 or more, provided that a total of k, p, q and r is larger than zero. k is preferably an integer of from 2 to 42, further preferably an integer of from 2 to 22, in particular an integer of from 2 to 13. p is preferably an integer of from 1 to 6000, further preferably an integer of from 5 to 1500, in particular an integer of from 10 to 300. q is preferably an integer of from 0 to 20, further preferably an integer of from 0 to 10, in particular an integer of from 0 to 5. r is preferably an integer of from 0 to 10, further preferably an integer of from 0 to 5, in particular an integer of from 0 to 3. The aminoalkyl group-containing siloxane preferably has a weight average molecular weight of 500 to 20,000, in particular 1,000 to 40,000. In the present invention, a weight average molecular weight is determined by gel permeation chromatography (GPC) and reduced to polystyrene. The bonding order of the parenthesized siloxane units is not limited. The siloxane units may be sequenced at random or form a block unit.

In the formula (1), $R^1$ is, independently of each other, a hydroxyl group, an alkoxyl group, a substituted or unsubstituted monovalent hydrocarbon group having 1 to 20 carbon atoms, or a group represented by the following formula (2), (3) or (6), provided that at least one of $R^1$ is the group represented by the following formula (2).

$$-(CR^2H)_a-(NHCH_2CH_2)_b-NH_2 \quad (2)$$

$$(CR^2H)_c-O-(C_2H_4O)_d-(C_3H_6O)_e-R^3 \quad (3)$$

$$-(CR^2H)_f-(R^5{}_2SiO)_s-SiR^5{}_3 \quad (6)$$

Examples of the monovalent hydrocarbon group having 1 to 20 carbon atoms include alkyl groups having 1 to 20 carbon atoms, cycloalkyl groups having 3 to 20 carbon atoms, alkenyl groups having 2 to 20 carbon atoms, aryl groups having 6 to 20 carbon atoms and aralkyl groups having 7 to 20 carbon atoms. For instance, unsubstituted monovalent hydrocarbon group includes alkyl groups such as a methyl group, an ethyl group, a propyl group, a butyl group, a pentyl group, a hexyl group, a heptyl group, an octyl group, a nonyl group, a decyl group, a dodecyl group, a tetradecyl group, a hexadecyl group and a octadecyl group; cycloalkyl groups such as a cyclopentyl group and a cyclohexyl group; alkenyl groups such as a vinyl group and an allyl group; aryl groups such as a phenyl group, a tolyl group and a naphthyl group; and aralkyl groups such as a benzyl group and a phenethyl group. The substituted monovalent hydrocarbon group includes those where a part or the whole of the hydrogen atoms bonded to carbon atoms are replaced with a halogen atom, an amino group, an acryloxy group, a methacryloxy group, an epoxy group, a mercapto group, a carboxyl group and a hydroxyl group.

$R^1$ is preferably a unsubstituted monovalent hydrocarbon group having 1 to 6 carbon atoms such as a methyl group, an ethyl group, a butyl group and a phenyl group, or the group represented by the aforesaid formula (2), (3) or (6). Further, a methyl group, a butyl group, a phenyl group, and the group represented by the aforesaid formula (2), (3) or (6) are further preferable. In particular, a methyl group, a phenyl group, and the group represented by the aforesaid formula (2), (3) or (6) are preferable. At least one of $R^1$ is the group represented by the formula (2). Preferably, the aminoalkyl group-containing siloxane has at least one polyoxyalkylene group. Therefore, preferably at least one of $R^1$ is the group represented by the formula (2) and at least one of $R^1$ is the group represented by the formula (3).

In the formulas (2), (3) and (6), $R^2$ is, independently of each other, a hydrogen atom or an unsubstituted monovalent hydrocarbon group having 1 to 20 carbon atoms. Examples of the unsubstituted monovalent hydrocarbon group having 1 to 20 carbon atoms include alkyl groups having 1 to 20 carbon atoms, cycloalkyl groups having 3 to 20 carbon atoms, alkenyl groups having 2 to 20 carbon atoms, aryl groups having 6 to 20 carbon atoms and aralkyl groups having 7 to 20 carbon atoms. The further detail is as described for $R^1$. $R^2$ is preferably a hydrogen atom or a monovalent hydrocarbon group having 1 to 6 carbon atoms such as a methyl group, an ethyl group, a propyl group, a butyl group and a phenyl group. In particular, a hydrogen atom and a methyl group are preferable.

In the formula (2), a is an integer of from 2 to 11, preferably 2 or 3, in particular 3. b is an integer of from 0 to 10, preferably an integer of from 0 to 5, in particular 0 or 1. Preferably, the structure represented by $-(CR^2H)_a-$ in the formula (2) is one of the following structures:
  $-CH_2CH_2CH_2-$, $-CMeHCH_2-$, $-CH_2CMeHCH_2-$
  $-CH_2CMeH-$, $-CMeHCH_2CH_2-$, $-CH_2CH_2CMeH-$.

In the formula (3), $R^3$ is an unsubstituted monovalent hydrocarbon group having 1 to 20, preferably 1 to 6 carbon atoms, a hydrogen atom or $-COR^4$. $R^4$ is an unsubstituted monovalent hydrocarbon group having 1 to 20, preferably 1 to 6 carbon atoms. Examples of the monovalent hydrocarbon group include alkyl groups, cycloalkyl groups, alkenyl groups, aryl groups and aralkyl groups. The further detail is as described for $R^1$. $R^4$ is preferably a methyl group, an ethyl group, a propyl group, a butyl group and a phenyl group. A methyl or butyl group is preferable. $R^3$ is preferably a hydrogen atom, a methyl group, an ethyl group, a propyl group, a butyl group, or $-COR^4$. In particular, $R^3$ is a hydrogen atom, a methyl group, a butyl group, $-COMe$ or $-COBu$. The present preparation method explained below can provide the compound having the polyether chain whose terminal, $R^3$, is a hydrogen atom.

In the formula (3), c is an integer of from 2 to 11, preferably 2 or 3, in particular 3. d is an integer of from 0 to 100, preferably an integer of from 0 to 50, in particular an integer of from 0 to 25. e is an integer of from 0 to 100, preferably an integer of from 0 to 50, in particular an integer of from 0 to 25, provided that a total of d and e is larger than zero. Preferably, the structure represented by $-(CR^2H)_c-$ in the formula (3) is one of the following structures:
  $-CH_2CH_2CH_2-$, $-CMeHCH_2-$, $-CH_2CMeHCH_2-$
  $-CH_2CMeH-$, $-CMeHCH_2CH_2-$, $-CH_2CH_2CMeH-$ Preferably, the structure represented by $-(C_3H_6O)_e-$ in the formula (3) is one of the following structures:
  $-(CH_2CH_2CH_2O)_e-$
  $-(CMeHCH_2O)_e-$
  $-(CH_2CMeHO)_e-$ The units represented by $-(C_2H_4O)_d-$ and $-(C_3H_6O)_e-$ may be sequenced at random or form a block unit.

In the formula (6), $R^5$ is, independently of each other, a hydroxyl group, an alkoxyl group or a substituted or unsubstituted monovalent hydrocarbon group having 1 to 20 carbon atoms. Examples of the monovalent hydrocarbon group having 1 to 20 carbon atoms include alkyl groups having 1 to 20 carbon atoms, cycloalkyl groups having 3 to 20 carbon atoms, alkenyl groups having 2 to 20 carbon atoms, aryl groups having 6 to 20 carbon atoms and aralkyl groups having 7 to 20 carbon atoms. The further detail is as described for $R^1$. $R^5$ is preferably an unsubstituted monovalent hydrocarbon group having 1 to 6 carbon atoms such as a methyl group, an ethyl group, a propyl group, a butyl group and a phenyl group. A methyl group, a butyl group and a phenyl group are further preferable. In particular, a methyl group and a phenyl group are preferable.

In the formula (6), f is an integer of from 2 to 11, preferably 2 or 3, in particular 3. s is an integer of from 0 to 1000, preferably an integer of from 4 to 100, in particular an integer of from 4 to 30. Preferably, the structure represented by —$(CR^2H)_f$— in the formula (6) is one of the following structures:

—$CH_2CH_2CH_2$—, —CMeHCH$_2$—, —$CH_2$CMeHCH$_2$—
—$CH_2$CMeH—, —CMeHCH$_2$CH$_2$—, —$CH_2CH_2$CMeH—

As described above, when an aminoalkyl group-containing siloxane is prepared according to the conventional manners, by-products such as hexamethylcyclotrisiloxane, octamethylcyclotetrasiloxane and anaminoalkyl group-containing cyclic siloxane generate and, therefore, an aminoalkyl group-containing siloxane having a high purity is not obtained. In contrast, the present method explained below in detail attains a decreased amount of the cyclic siloxanes as an impurity contained in the aminoalkyl group-containing siloxane obtained. That is, the present method attains a decreased amount of the cyclic siloxane represented by the following formula (4) as an impurity to 1 part by mass or less, preferably 0.5 part by mass or less, in particular 0.1 part by mass or less, further 0.01 part by mass or less, relative to 100 parts by mass of the aminoalkyl group-containing siloxane. The amount may be even zero part by mass.

$$(SiBMeO)_m(SiMe_2O)_n \quad (4)$$

wherein m is an integer of from 0 to 4, preferably an integer of from 0 to 3, further an integer of from 0 or 2, in particular 1; n is an integer of from 3 to 20, preferably an integer of from 3 to 10, further an integer of from 3 to 8, in particular an integer of from 3 to 6; and B is the group represented by the aforesaid formula (2). The cyclic siloxane may be one, two or more kinds of this. When the siloxane is two or more kinds of cyclic siloxanes, the total amount of the cyclic siloxanes may be 1 part by mass or less, preferably 0.5 part by mass or less, in particular 0.1 part by mass or less, further 0.01 part by mass or less, relative to 100 parts by mass of the aminoalkyl group-containing siloxane. In particular, each amount of the cyclic siloxanes can be 0.1 part by mass or less, further 0.01 part by mass or less, relative to 100 parts by mass of the aminoalkyl group-containing siloxane. The amount may be even zero part by mass.

The aminoalkyl group-containing siloxane represented by the aforesaid general formula (1) may has a linear, branched, cyclic or three-dimensionally cross-linked structure. A linear or branched siloxane is preferable. The linear or branched siloxane is represented by the following general formula (5):

$$R^6—(R^7{}_2SiO)_x—(R^7BSiO)_y—(R^7PSiO)_z—SiR^7{}_2R^6 \quad (5)$$

In the formula (5), $R^6$ is, independently of each other, a hydroxyl group, an alkoxyl group, a substituted or unsubstituted monovalent hydrocarbon group having 1 to 20, preferably 1 to 6 carbon atoms, or a group represented by the aforesaid formula (2) or (3). Examples of the substituted or unsubstituted monovalent hydrocarbon group are as described for $R^1$. $R^6$ is preferably a methyl group, an ethyl group, a propyl group, a butyl group, a phenyl group, or a group represented by the aforesaid formula (2) or (3), in particular, a methyl group, a phenyl group, or a group represented by the aforesaid formula (2) or (3). B is a group represented by the aforesaid formula (2), and P is a group represented by the aforesaid formula (3). The aminoalkyl group-containing siloxane has at least one group represented by the formula (2). Particularly, the aminoalkyl group-containing siloxane has at least one group represented by the formula (2) and at least one polyoxyalkylene group represented by the formula (3). A bonding order of the parenthesized siloxane units is not limited. The parenthesized siloxane units may be sequenced at random or form a block unit.

In the formula (5), $R^7$ is, independently of each other, a hydroxyl group, an alkoxyl group, a substituted or unsubstituted monovalent hydrocarbon group having 1 to 20, preferably 1 to 6 carbon atoms, a group represented by the aforesaid formula (6), or a group represented by the following formula (7). Examples of the substituted or unsubstituted monovalent hydrocarbon group are as described for $R^1$. $R^7$ is preferably a hydrocarbon group having 1 to 6 carbon atoms, a group represented by the aforesaid formula (6), or a group represented by the following formula (7), for instance, a methyl group, an ethyl group, a propyl group, a butyl group, a phenyl group, or a group represented by the formula (6) or (7). Preferably, $R^7$ is a methyl group, a butyl group, a phenyl group, or a group represented by the formula (6) or (7). In particular, $R^7$ is a methyl group, a phenyl group, or a group represented by the formula (6) or (7).

$$—O—(R^5{}_2SiO)_t—SiR^5{}_3 \quad (7)$$

wherein $R^5$ is as defined above and t is an integer of from 0 to 1000, preferably an integer of from 0 to 100, further preferably an integer of from 4 to 30.

In the formula (5), x is an integer of from 0 to 2000, preferably an integer of from 0 to 500, further preferably an integer of from 5 to 100, further preferably an integer of from 5 to 50. y is an integer of from 0 to 2000, preferably an integer of from 0 to 500, further preferably an integer of from 1 to 100, further preferably an integer of from 2 to 20. z is an integer of from 0 to 2000, preferably an integer of from 0 to 500, further preferably an integer of from 1 to 100, further preferably an integer of from 2 to 20. A total of x, y and z is larger than zero, preferably 10 or larger. When y is zero, at least one of $R^6$ is the group represented by the aforesaid formula (2). Further preferably, at least one of $R^6$ is the group represented by the aforesaid formula (2) when y is zero. At least one of $R^6$ is the group represented by the aforesaid formula (3) when z is zero. The aminoalkyl group-containing siloxane preferably has a weight average molecular weight of 500 to 200,000, in particular 1,000 to 40,000. In the present invention, the weight average molecular weight is determined by gel permeation chromatography (GPC) and reduced to polystyrene.

The present method comprises i) an addition reaction step and ii) a deprotection step. The present method will be explained below in detail.

i) Addition Reaction Step

In this step, the following compound (A) is addition reacted with the following compound (B) and optionally the following compounds (C) and/or (D):

(A) a hydrogensiloxane represented by the following general formula (9):

$$(R^8{}_3SiO_{1/2})_k(R^8{}_2SiO_{2/2})_p(R^8{}_1SiO_{3/2})_q(SiO_{4/2})_r \quad (9)$$

wherein R⁸ is, independently of each other, a hydrogen atom, a hydroxyl group, an alkoxyl group, or a substituted or unsubstituted monovalent hydrocarbon group having 1 to 20 carbon atoms, provided that at least one of R⁸ is a hydrogen atom, k, p, q and r are as defined above and a bonding order of the parenthesized siloxane units is not limited;

(B) a compound represented by the following formula (10) and having a protected amino group:

$$CHR^2=CR^2-(CR^2H)_{a'}-(NQCH_2CH_2)_b-NQ_2 \quad (10)$$

wherein a' is "a" minus 2, that is, an integer of from 0 to 9, b and R² are as defined above, Q is a silyl group represented by —SiR⁹₃, wherein R⁹ is, independently of each other, an unsubstituted monovalent hydrocarbon group having 1 to 20 carbon atoms;

(C) a polyether represented by the following formula (11):

$$CHR^2=CR^2-(CR^2H)_{c'}-O-(C_2H_4O)_d-(C_3H_6O)_e-R^3 \quad (11)$$

wherein c' is c minus 2, that is, an integer of from 0 to 9, and d, e, R² and R³ are as defined above, (D) a (poly)siloxane represented by the following formula (12):

$$CHR^2=CR^2-(CR^2H)_{f'}-(R^5_2SiO)_s-SiR^5_3 \quad (12)$$

wherein f' is f minus 2, that is, an integer of from 0 to 9, and R², R⁵ and s are as defined above.

Compound (A) is addition reacted with compound (B) to obtain an aminoalkyl group-containing siloxane. Compounds (C) and (D) are optional components. Compound (A) is addition reacted with compounds (B) and, additionally, (C) to obtain an aminoalkyl group- and polyoxyalkylene group-containing siloxane. Compound (A) is addition reacted with compounds (B) and, additionally, (D) to obtain a siloxane having an aminoalkyl group and the branched chain represented by the aforesaid formula (6). Particularly, compound (A) is preferably addition reacted with compounds (B) and (C) and optionally compound (D) to obtain an aminoalkyl group- and polyoxyalkylene group-containing siloxane optionally having the branched chain represented by the aforesaid formula (6).

The hydrogensiloxane (A) represented by the aforesaid formula (9) is preferably linear or blanched hydrogensiloxane (A') represented by the following general formula (13). When the hydrogensiloxane (A') is used as a starting material, the aminoalkyl group-containing linear or blanched siloxane represented by the general formula (5) is obtained.

$$(A')R^{11}-(R^{10}_2SiO)_v-SiR^{11}_3 \quad (13).$$

In the formula (13), R¹¹ is, independently of each other, a hydrogen atom, a hydroxyl group, an alkoxyl group, or a substituted or unsubstituted monovalent hydrocarbon group having 1 to 20 carbon atoms, R¹⁰ is, independently of each other, a hydrogen atom, a hydroxyl group, an alkoxyl group, a substituted or unsubstituted monovalent hydrocarbon group having 1 to 20 carbon atoms, or the group represented by the aforesaid formula (7), provided that at least one of R¹⁰ and R¹¹ is a hydrogen atom. v is a total of x, y and z, i.e. v is an integer of from 1 to 6000, preferably an integer of from 1 to 1500, further preferably an integer of from 7 to 300, more preferably an integer of from 9 to 90. A bonding order of the parenthesized siloxane units is not limited. The siloxane units may be sequenced at random or form a block unit.

The hydrogensiloxane (A) and (A') have at least one SiH group. In the aforesaid formulas (9) and (13), R⁸ and R¹¹ are, independently of each other, a hydrogen atom, a hydroxyl group, an alkoxyl group, or a substituted or unsubstituted monovalent hydrocarbon group having 1 to 20, preferably 1 to 6 carbon atoms. R¹⁰ is, independently of each other, a hydrogen atom, a hydroxyl group, an alkoxyl group, a substituted or unsubstituted monovalent hydrocarbon group having 1 to 20, preferably 1 to 6 carbon atoms, or the group represented by the aforesaid formula (7). Examples of the substituted or unsubstituted monovalent hydrocarbon group are as described for R¹. Preferred are a hydrogen atom, a methyl group, an ethyl group, a propyl group, a butyl group and a phenyl group.

In particular, a hydrogen atom, a methyl group and a phenyl group is preferable. Here, at least one, preferably two or more, particularly five or more, of the groups represented by R⁸ is a hydrogen atom and at least one, preferably two or more, particularly five or more, of the groups represented by R¹⁰ or R¹¹ is a hydrogen atom.

The hydrogensiloxanes (A) and (A') may comprise a cyclic siloxane represented by the following formula (8) which generates in the preparation process of these compounds.

$$(SiHMeO)_m(SiMe_2O)_n \quad (8)$$

wherein m is an integer of from 0 to 4 and n is an integer of from 3 to 20.

In the present method, the amount of the cyclic siloxane contained in the hydrogensiloxane is preferably 1 part by mass or less, further preferably 0.5 part by mass or less, further preferably 0.1 part by mass or less, more preferably 0.01 part by mass or less, relative to 100 parts by mass of the hydrogensiloxane. The amount may be even zero part by mass. On account of such hydrogensiloxane used as a starting material, an amount of the cyclic siloxane contained in the aminoalkyl group-containing siloxane is further decreased.

Compound (B) has an amino group protected by a silyl group represented by —SiR⁹₃, and an unsaturated group. In the aforesaid formula (10), R² is as defined above. Q is —SiR⁹₃. R⁹ is, independently of each other, an unsubstituted monovalent hydrocarbon group having 1 to 20, preferably 1 to 6 carbon atoms. Examples of the unsubstituted monovalent hydrocarbon group are as described for R¹. R⁹ is preferably a hydrocarbon group having 1 to 6 carbon atoms, such as a methyl group, an ethyl group, a propyl group, a butyl group and a phenyl group. A methyl group or a butyl group is more preferable. Examples of the silyl group include a trimethylsilyl group, a triethylsilyl group, a triphenylsilyl group, a t-butyldimethylsilyl group and a triisopropylsilyl group. A trimethylsilyl group is more preferable.

In the formula (10), a' is "a" minus 2, that is, an integer of from 0 to 9, preferably 1 or 0, particularly 1. b is an integer of from 0 to 10, preferably an integer of from 0 to 5, particularly 0 or 1.

Preferably, the group represented by CHR²=CR²—(CR²H)_{a'}— in the formula (10) is one of the following groups:

CH₂=CHCH₂—, CMeH=CHCH₂—, CH₂=CMeCH₂—.

For instance, a compound represented by the formula (10) and having the aforesaid group is preferably bis(trimethylsilylallyl)amine.

Compound (C) is a polyether compound having an unsaturated group. In the aforesaid formula (11), R² and R³ are as defined above. c' is c minus 2, that is, an integer of from 0 to 9, preferably 1 or 0, particularly 1. d is an integer of from 0 to 100, preferably an integer of from 0 to 50, particularly an integer of from 0 to 25. e is an integer of from 0 to 100, preferably an integer of from 0 to 50, particularly an integer of from 0 to 25. Here, a total of d and e is more than zero.

Preferably, the group represented by $CHR^2=CR^2-(CR^2H)_{c'}-$ in the formula (11) is one of the following groups:

$CH_2=CHCH_2-$, $CMeH=CHCH_2-$, $CH_2=CMeCH_2-$.

Compound (D) is a poly(siloxane) having an unsaturated group. In the aforesaid formula (12), $R^2$ and $R^5$ are as defined above. f' is f minus 2, that is, an integer of from 0 to 9, preferably 1 or 0, particularly 1. s is as defined above, an integer of from 0 to 1000, preferably an integer of from 0 to 100, particularly an integer of from 4 to 30.

Preferably, the group represented by $CHR^2=CR^2-(CR^2H)_{c'}-$ in the formula (12) is one of the following groups:

$CH_2=CHCH_2-$, $CMeH=CHCH_2-$, $CH_2=CMeCH_2-$.

The addition reaction is preferably conducted in the presence of a catalyst which may be a well-known addition reaction catalyst. Examples of the catalyst include a metal catalyst having platinum, palladium, rhodium, ruthenium, gold or nickel. A catalyst having platinum, palladium or rhodium is preferable, particularly platinum. Specifically, $PtCl_4$, $H_2PtCl_6 \cdot 6H_2O$, a platinum-ether complex, a platinum-olefin complex, $PdCl_2(PPh_3)_2$, $PdCl_2(PhCN)_2$ and $RhCl_2(PPh_3)_3$, wherein Ph is phenyl group, may be used. The catalyst may be used singly or in combination of two or more of them. The catalyst may be diluted with a solvent such as alcohols, aromatic hydrocarbons, hydrocarbons, ketones and basic solvents. Particularly, a complex of a chloroplatinic acid neutralized with sodium hydrogen carbonate, and 1,1,3,3-tetramethyl-1,3-divinyldisiloxane, i.e. Karstedt catalyst, is most preferable as an addition reaction catalyst.

The catalyst may be used in a catalytic amount. The catalytic amount is such that the addition reaction proceeds sufficiently. For instance, the amount of the catalyst is such that the amount of a metal is 0.02 part by mass or less, preferably 0.0001 to 0.02 part by mass, preferably 0.00003 to 0.01 part by mass, more preferably 0.0005 to 0.005 part by mass, relative to 100 parts by mass of compound (A) or (A'). The catalyst may be added at the starting point of the reaction or may be added in several batches during the reaction. In the present method, the reaction proceeds sufficiently even with the aforesaid small amount of the catalyst. However, when the amount of the catalyst is too small, the reaction rate is too slow. Therefore, the aforesaid lower limit or more of the amount is preferable. If the amount of the catalyst is too much, the reaction rate is not particularly improved, which is uneconomical.

If the aminoalkyl group-containing siloxane obtained contains a large amount of the remaining metal catalysts, discoloration is caused. Therefore, it is preferred that an amount of the remaining metal catalyst in the obtained siloxane is small. In the present method, the amount of the metal catalyst remaining in the sixane can be such that the amount of the metal atom is 0.02 part by mass or less, preferably 0.005 part by mass or less, preferably 0.002 part by mass or less, relative to 100 parts by mass of the aminoalkyl group-containing siloxane, particularly the amonoalkyl group- and polyoxyalkylene group-containing siloxane.

The amounts of compound (B) and the optional compounds (C) and (D) to be subjected to the addition reaction are such that the total number of the alkenyl groups of compound (B) and the optional compounds (C) and (D) is larger than or equal to the number of the SiH group of compound (A). For instance, a ratio of the total number of the alkenyl groups to the number of the SiH group is 1 to 5, preferably 1 to 2, particularly 1 to 1.5.

The order of the addition reactions of compound (B) and the optional compounds (C) and (D) with compound (A) is not limited. Compounds (C) and (D) may be addition reacted after the addition reaction of compound (B). Compounds (B) and (D) may be addition reacted after the addition reaction of compound (C). Compounds (B) and (C) may be addition reacted after the addition reaction of compound (D) with compound (A). Compounds (B), (C) and (D) together may be addition reacted with compound (A). In many cases, the unreacted compound (B) can be removed in a latter step and, therefore, it is preferred that compound (B) is reacted after the addition reaction of compounds (C) and (D). In this manner, compound (B) may be added while monitoring a progress of the reaction and, thereby, the hydrosilyl group is completely reacted.

The aforesaid addition reaction may be carried out in the presence of at least one solvent. Examples of the solvent include toluene, xylene, benzene, hexane, cyclohexanone, methylcyclohexane, ethylcyclohexanone, chloroform, dichloromethane, carbon tetrachloride, THF, diethyl ether, acetone, methyl ethyl ketone, DMF, acetonitrile, methanol, ethanol, 1-propanol, 2-propanol, 1-butanol and 2-butanol. The solvent may be distilled off or not after the addition reaction.

The reaction temperature is 20 to 250 degrees C., preferably 40 to 180 degrees C., further preferably 80 to 120 degrees C. The reaction time is within 20 hours, preferably within 12 hours, particularly within 8 hours.

According to the aforesaid addition reaction, the compound represented by the following formula (14) is prepared.

$$(R^1{}_3SiO_{1/2})_k(R^1{}_2SiO_{2/2})_p(R^1SiO_{3/2})_q(SiO_{4/2})_r \quad (14)$$

wherein $R^1$ is, independently of each other, a hydroxyl group, an alkoxyl group, a substituted or unsubstituted monovalent hydrocarbon group having 1 to 20 carbon atoms, or a group represented by the following formula (B'), or the group represented by the aforesaid formula (3) or (6). k, p, q, and r are as defined above.

$$-(CR^2H)_1-(HQCH_2CH_2)_b-NQ_2 \quad (B')$$

wherein Q is a silyl group represented by $-SiR^9{}_3$ and $R^9$ is as defined above.

When the hydrogensiloxane is the aforesaid compound (A'), the compound represented by the following formula (15) is obtained in the aforesaid addition reaction.

$$R^6-(R^7{}_2SiO)_x-(R^7B'SiO)_y-(R^7PSiO)_z-SiR^8{}_3 \quad (15)$$

wherein $R^6$ and $R^7$ are as defined above, or the group represented by the aforesaid formula (B'), wherein B' is the group represented by the aforesaid formula (B'). x, y, z and P are as defined above.

ii) Deprotection

The silil group, Q, bonding to the amino group of the compound represented by the formula (14) or (15) is removed from the amino group, hereinafter referred to as deprotection, to obtain the aminoalkyl group-containing siloxane represented by the formula (1) or (5).

The deprotection is carried out in the presence of a catalyst. Any known catalyst may be used and an acid catalyst is preferable. For instance, use may be made of acetic acid or an amine salt thereof, hydrochloric acid or an amine salt thereof, sulfuric acid or an amine salt thereof, nitric acid or an amine salt thereof, methanesulfonic acid or an amine salt thereof, trifluoromethanesulfonic acid or an amine salt thereof, p-toluenesulfonic acid or an amine salt thereof, benzenesulfonic acid or an amine salt thereof, and a cation-exchange resin. Examples of the amine salt include an ammonium salt and a triethylamine salt. Preferred are acetic acid, hydrochloric acid, sulfuric acid, methanesulfonic acid and trifluoromethanesulfonic acid. In particular, acetic acid, methanesulfonic acid and trifluoromethanesulfonic acid are preferred. The amount of the acid catalyst is 0.01 to 1 molar equivalent, preferably 0.05 to 0.5 molar equivalent, more preferably 0.1 to 0.3 molar equivalent, relative to the protected amino group of the compound represented by the formula (14) or (15).

The deprotection is carried out in the presence of a solvent. The solvent is preferably protonic, such as water, methanol, ethanol, 1-propanol, 2-propanol, 1-butanol and 2-butanol. Ethanol, 1-propanol and 2-propanol are further preferable. Particularly, ethanol and 2-propanol are preferable.

The temperature of the deprotection may properly be decided, preferably such as 20 to 200 degrees C., further preferably 40 to 120 degrees C., further preferably 60 to 90 degrees C. The reaction time may properly be decided, preferably within 10 hours, further preferably within 7 hours, particularly within 4 hours.

iii) Neutralization

The present method further comprises a step of neutralizing the acid catalyst used in the deprotection step ii). The acid catalyst may be neutralized by adding a neutralizing agent or washing with water. Examples of the neutralizing agent include alkali metal salts such as lithium carbonate, sodium carbonate, potassium carbonate, ammonium carbonate, lithium hydrogen carbonate, sodium hydrogen carbonate, potassium hydrogen carbonate, lithium hydroxide, sodium hydroxide and potassium hydroxide. Further, adsorbents such as anion-exchange resins and Kyowado™ 200, 500, or 2000, ex Kyowa Chemical Industry Co., Ltd. can be used. Preferred are sodium carbonate, potassium carbonate, sodium hydrogen carbonate, potassium hydrogen carbonate, and Kyowado™ 200, 500, or 2000. Further preferred is Kyowado™ 200, 500, or 2000. Kyowado™ 200 is aluminum hydroxide, Kyowado™ 500 is a synthetic hydrotalcite, $Mg_{1-x}Al_x(OH)_2(CO_3)_{x/2} \cdot mH_2O$, and Kyowado™ 2000 is a solid solution composed of magnesium and aluminum.

The neutralizing agent is used at 0 to 100 degrees C., preferably 10 to 80 degrees C., more preferably 20 to 50 degrees C. When the neutralizing agent is insoluble in the reaction mixture or an insoluble salt generates in the neutralization, the insoluble neutralizing agent or the salt are can be removed by filtration. When the neutralizing agent is soluble in the reaction mixture, the neutralizing agent can be removed by washing with water. The salt may not be removed.

The present method may further comprise, in addition to the aforesaid steps i) to iii), at least one of steps, iv) removing the solvent, v) decoloration, vi) deodorization and vii) removal of an unwanted material by filtration. These steps may be conducted if needed. The order of these steps is not limited.

iv) Removing the Solvent

An amine becomes sometimes yellow when it is oxygenized. Therefore, the solvent is preferably removed in an inert gas atmosphere. Examples of the inert gas include nitrogen, argon and helium. Further, the amine discolors easily at a high temperature and, therefore, the removal may be conducted at a reduced pressure. The temperature is 40 to 200 degrees C., preferably 50 to 150 degrees C., particularly 70 to 120 degrees C. The reduced pressure is 300 mmHg or lower, preferably 100 mmHg or lower, particularly 10 mmHg or lower.

v) Decoloration

If the product obtained discolors, it may be decolored by an adsorbent such as activated carbon, activated alumina, zeolite, silica gel, a cation-exchange resin, an anion-exchange resin, mesoporous silica and carbon nanotubes.

vi) Deodorization

If the product obtained has any odor, it can be deodorized by an adsorbent such as activated carbon, activated alumina, zeolite, silica gel, a cation-exchange resin, an anion-exchange resin, mesoporous silica and carbon nanotubes. Deodorization may be conducted by injecting an inert gas such as nitrogen, argon and helium. Deodorization proceeds easily with heating at a reduced pressure. The temperature is 20 to 150 degrees C., preferably 30 to 100 degrees C., particularly 40 to 70 degrees C. The reduced pressure is 300 mmHg or lower, preferably 100 mmHg or lower, particularly 10 mmHg or lower.

vii) Filtration

If the product obtained contains any unwanted material, the material can be removed by filtration with a filter paper or a strainer.

EXAMPLES

The present invention will be explained below in further detail with reference to a series of the Examples and the Comparative Examples, though the present invention is in no way limited by these Examples.

In the following descriptions, the $^1$H-NMR analyses were conducted with ECX-500II, ex JEOL Ltd. The determination solvent in the $^1$H-NMR was deuterated chloroform.

In the following Examples and Comparative Examples, the total amount of the cyclic siloxanes as an impurity contained in the hydrogensiloxane to be subjected to the addition reaction, was 10 ppm or less, that is, 0.001 part by mass or less, relative to 100 parts by mass of the hydrogensiloxane. The cyclic siloxanes herein are compounds represented by $(Me_2SiO)_3(MeHSiO)_1$, $(Me_2SiO)_4(MeHSiO)_1$, $(Me_2SiO)_5(MeHSiO)_1$ or $(Me_2SiO)_6(MeHSiO)_1$.

Example 1

32.27 Parts by mass of an allylpolyether represented by $CH_2=CH-(CH_2)-O-(C_2H_4O)_3-H$ and 0.0167 part by mass of a solution of a complex of a chloroplatinic acid neutralized with sodium hydrogen carbonate and a vinyl siloxane in ethanol, containing 3.0 wt % of platinum, were added to 100 parts by mass of a hydrogensiloxane represented by a general formula: $Me-(Me_2SiO)_{30}-(MeHSiO)_5-SiMe_3$, and heated with stirring at 100 degrees C. for 2 hours. Then, 16.16 parts by mass of bis(trimethylsilyl)allylamine represented by $CH_2=CH-(CH_2)-NTMS_2$ and 0.0333 part by mass of a solution of a complex of a chloroplatinic acid neutralized with sodium hydrogen carbonate and a vinyl siloxane in ethanol, containing 3.0 wt % of platinum, were added to the mixture. The mixture was further heated with stirring at 100 degrees C. for 4 hours. Then, 0.96 part by mass of acetic acid and 100 parts by mass of isopropyl alcohol were added to the mixture and heated with stirring at 80 degrees C. for 3 hours, to which 8 parts by mass of Kyowado™ 500 was added as a neutralizing agent, stirred at room temperature for 2 hours, then, the solvent was removed at 100 degrees C. and 10 mmHg and, then, Kyowado™ 500 was filtrated off with a filter, NA-500, ex Advantech Co., Ltd., to obtain a product. The total amount of the catalyst used in the aforesaid reactions was such that an amount of the platinum metal was 0.0015 part by mass, relative to 100 parts by mass of the hydrogensiloxane. The product was analyzed by $^1$H-NMR to find that it was represented by the following general formula:

Me-(Me$_2$SiO)$_{30}$-(MeBSiO)$_1$—(MePSiO)$_4$—SiMe$_3$ wherein B is —C$_3$H$_6$NH$_2$, P is —C$_3$H$_6$O(C$_2$H$_4$O)$_3$—H and the bonding order of the parenthesized siloxane units is not limited.

The product was analyzed by $^1$H-NMR to find that the compound had no hydrosilyl group and the trimethylsilyl group was all removed. The each amount of octamethylcyclotetrasiloxane and decamethylcyclopentasiloxane was under the detection limit, i.e. 5 ppm, relative to a total mass of the product and an amount of the remaining platinum atom was 15 ppm or less, relative to a total mass of the product.

Further, the product was analyzed by GC to find that the total amount of the cyclic siloxanes which were contained in the product and represented by (Me$_2$SiO)$_3$(MeBSiO)$_1$, (Me$_2$SiO)$_4$(MeBSiO)$_1$, (Me$_2$SiO)$_5$(MeBSiO)$_1$ or (Me$_2$SiO)$_6$(MeBSiO)$_1$, wherein B is —C$_3$H$_6$NH$_2$, was 10 ppm or less, that is, 0.001 part by mass or less, relative to 100 parts by mass of the product.

Example 2

The procedures of Example 1 were repeated to obtain a product except that the amount of the allylpolyether represented by CH$_2$=CH—(CH$_2$)—O—(C$_2$H$_4$O)$_3$—H was 20.17 parts by mass, the amount of bis(trimethylsilyl)allylamine represented by CH$_2$=CH—(CH$_2$)NTMS$_2$ was 24.23 parts by mass, the amount of acetic acid was 1.44 parts by mass and the amount of Kyowado™ 500 was 12 parts by mass. The product was analyzed by $^1$H-NMR to find that it was represented by the following general formula:

Me1(Me$_2$SiO)$_{30}$-(MeBSiO)$_2$-(MePSiO)$_3$-SiMe$_3$ wherein B is —C$_3$H$_6$NH$_2$, P is —C$_3$H$_6$O (C$_2$H$_4$O)$_3$—H and the bonding order of the parenthesized siloxane units is not limited.

$^1$H-NMR analysis also finds that the compound had no hydrosilyl group and the trimethylsilyl group was all removed. The each amount of octamethylcyclotetrasiloxane and decamethylcyclopentasiloxane was under the detection limit, i.e. 5 ppm, relative to a total mass of the product and an amount of the remaining platinum atom was 15 ppm or less, relative to a total mass of the product.

Further, the product was analyzed by GC to find that the total amount of the cyclic siloxanes which were contained in the product and represented by (Me$_2$SiO)$_3$(MeBSiO)$_1$, (Me$_2$SiO)$_4$(MeBSiO)$_1$, (Me$_2$SiO)$_5$(MeBSiO)$_1$ or (Me$_2$SiO)$_6$(MeBSiO)$_1$, wherein B is —C$_3$H$_6$NH$_2$, was 10 ppm or less, that is, 0.001 part by mass or less, relative to 100 parts by mass of the product.

Example 3

The procedures of Example 2 were repeated to obtain a product except that 46.83 parts by mass of allylpolyether represented by CH$_2$=CH—(CH$_2$)—O—(C$_2$H$_4$O)$_9$—H was used in place of the allylpolyether represented by CH$_2$=CH—(CH$_2$)—O—(C$_2$H$_4$O)$_3$—H. The product was analyzed by $^1$H-NMR to find that it was represented by the following general formula:

Me-(Me$_2$SiO)$_{30}$-(MeBSiO)$_2$—(MePSiO)$_3$—SiMe$_3$ wherein B is —C$_3$H$_6$NH$_2$, P is —C$_3$H$_6$O(C$_2$H$_4$O)$_9$—H and the bonding order of the parenthesized siloxane units is not limited.

$^1$H-NMR analysis also finds that the compound had no hydrosilyl group and the trimethylsilyl group was all removed. The each amount of octamethylcyclotetrasiloxane and decamethylcyclopentasiloxane was under the detection limit, i.e. 5 ppm, relative to a total mass of the product and an amount of the remaining platinum atom was 15 ppm or less, relative to a total mass of the product.

Further, the product was analyzed by GC to find that the total amount of the cyclic siloxanes which were contained in the product and represented by (Me$_2$SiO)$_3$(MeBSiO)$_1$, (Me$_2$SiO)$_4$(MeBSiO)$_1$, (Me$_2$SiO)$_5$(MeBSiO)$_1$ or (Me$_2$SiO)$_6$(MeBSiO)$_1$, wherein B is —C$_3$H$_6$NH$_2$, was 10 ppm or less, that is, 0.001 part by mass or less, relative to 100 parts by mass of the product.

Example 4

The procedures of Example 3 were repeated to obtain a product except that the amount of the allylpolyether represented by CH$_2$=CH—(CH$_2$)—O—(C$_2$H$_4$O)$_9$—H was 18.73 parts by mass, the amount of bis(trimethylsilyl)allylamine represented by CH$_2$=CH—(CH$_2$)-NTMS$_2$ was 40.39 parts by mass, the amount of acetic acid was 2.41 parts by mass and the amount of Kyowado™ 500 was 20 parts by mass. The product was analyzed by $^1$H-NMR to find that it was represented by the following general formula:

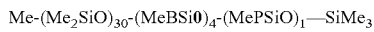

Me-(Me$_2$SiO)$_{30}$-(MeBSi0)$_4$-(MePSiO)$_1$-SiMe$_3$ wherein B is —C$_3$H$_6$NH$_2$, P is —C$_3$H$_6$O (C$_2$H$_4$O)$_9$—H and the bonding order of the parenthesized siloxane units is not limited.

$^1$H-NMR analysis also finds that the compound had no hydrosilyl group and the trimethylsilyl group was all removed. The each amount of octamethylcyclotetrasiloxane and decamethylcyclopentasiloxane was under the detection limit, i.e. 5 ppm, relative to a total mass of the product and an amount of the remaining platinum atom was 15 ppm or less, relative to a total mass of the product.

Further, the product was analyzed by GC to find that the total amount of the cyclic siloxanes which were contained in the product and represented by (Me$_2$SiO)$_3$(MeBSiO)$_1$, (Me$_2$SiO)$_4$(MeBSiO)$_1$, (Me$_2$SiO)$_5$(MeBSiO)$_1$ or (Me$_2$SiO)$_6$(MeBSiO)$_1$, wherein B is —C$_3$H$_6$NH$_2$, was 10 ppm or less, that is, 0.001 part by mass or less, relative to 100 parts by mass of the product.

Example 5

The procedures of Example 3 were repeated to obtain a product except that a hydrogensiloxane represented by the general formula:

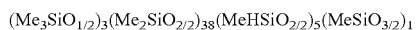

(Me$_3$SiO$_{1/2}$)$_3$(Me$_2$SiO$_{2/2}$)$_{38}$(MeHSiO$_{2/2}$)$_5$(MeSiO$_{3/2}$)$_1$ was used in place of the hydrogensiloxane used in Example 3, the amount of the allylpolyether was 32.42 parts by mass, the amount of bis(trimethylsilyl)allylamine was 17.24 parts by mass, the amount of acetic acid was 1.03 parts by mass and the amount of Kyowado™ 500 was 8.5 parts by mass.

The product was analyzed by $^1$H-NMR to find that it was represented by the following general formula:

$$(Me_3SiO_{1/2})_3(Me_2SiO_{2/2})_{38}(MeBSiO_{2/2})_2(MePSiO_{2/2})_3(MeSiO_{3/2})_1$$

wherein B is —$C_3H_6NH_2$, P is —$C_3H_6O(C_2H_4O)_9$—H and the bonding order of the parenthesized siloxane units is not limited.

$^1$H-NMR analysis also finds that the compound had no hydrosilyl group and the trimethylsilyl group was all removed. The each amount of octamethylcyclotetrasiloxane and decamethylcyclopentasiloxane was under the detection limit, i.e. 5 ppm, relative to a total mass of the product and an amount of the remaining platinum atom was 15 ppm or less, relative to a total mass of the product.

Further, the product was analyzed by GC to find that the total amount of the cyclic siloxanes which were contained in the product and represented by $(Me_2SiO)_3(MeBSiO)_1$, $(Me_2SiO)_4(MeBSiO)_1$, $(Me_2SiO)_5(MeBSiO)_1$ or $(Me_2SiO)_6(MeBSiO)_1$, wherein B is —$C_3H_6NH_2$, was 10 ppm or less, that is, 0.001 part by mass or less, relative to 100 parts by mass of the product.

Example 6

The procedures of Example 5 were repeated to obtain a product except that a hydrogensiloxane represented by the general formula:

$$(Me_3SiO_{1/2})_4(Me_2SiO_{2/2})_{47}(MeHSiO_{2/2})_5(SiO_{4/2})_1$$

was used in place of the hydrogensiloxane used in Example 5, the amount of the allylpolyether was 26.29 parts by mass, the amount of bis(trimethylsilyl)allylamine was 11.65 parts by mass, the amount of acetic acid was 0.70 parts by mass and the amount of Kyowado™ 500 was 5.8 parts by mass. The product was analyzed by $^1$H-NMR to find that it was represented by the following general formula:

$$(Me_3SiO_{1/2})_4(Me_2SiO_{2/2})_{47}(MeBSiO_{2/2})_2(MePSiO_{2/2})_3(SiO_{4/2})_1$$

wherein B is —$C_3H_6NH_2$, P is —$C_3H_6O(C_2H_4O)_9$—H and the bonding order of the parenthesized siloxane units is not limited.

$^1$H-NMR analysis also finds that the compound had no hydrosilyl group and the trimethylsilyl group was all removed. The each amount of octamethylcyclotetrasiloxane and decamethylcyclopentasiloxane was under the detection limit, i.e. 5 ppm, relative to a total mass of the product and an amount of the remaining platinum atom was 15 ppm or less, relative to a total mass of the product.
Further, the product was analyzed by GC to find that the total amount of the cyclic siloxanes which were contained in the product and represented by $(Me_2SiO)_3(MeBSiO)_1$, $(Me_2SiO)_4(MeBSiO)_1$, $(Me_2SiO)_5(MeBSiO)_1$ or $(Me_2SiO)_6(MeBSiO)_1$, wherein B is —$C_3H_6NH_2$, was 10 ppm or less, that is, 0.001 part by mass or less, relative to 100 parts by mass of the product.

Example 7

18.73 Parts by mass of an allylpolyether represented by $CH_2$=CH—$(CH_2)$—O—$(C_2H_4O)_9$—H, 31.59 parts by mass of a vinylsiloxane represented by $CH_2$=CH—$(Me_2SiO)_{10}Bu$, and 0.0167 part by mass of a solution of a complex of a chloroplatinic acid neutralized with sodium hydrogen carbonate and a vinyl siloxane in ethanol, containing 3.0 wt % of platinum, were added to 100 parts by mass of a hydrogensiloxane represented by a general formula: Me-$(Me_2SiO)_{30}$-$(MeHSiO)_5$—$SiMe_3$, and heated with stirring at 100 degrees C. for 2 hours. Then, 27.75 parts by mass of bis(trimethylsilyl)allylamine represented by $CH_2$=CH—$(CH_2)$-$NTMS_2$ and 0.0333 part by mass of a solution of a complex of a chloroplatinic acid neutralized with sodium hydrogen carbonate and a vinyl siloxane in ethanol, containing 3.0 wt % of platinum, were added to the reaction mixture and further heated with stirring at 100 degrees C. for 4 hours. Then, 1.66 parts by mass of acetic acid and 100 parts by mass of isopropyl alcohol were added to the mixture and heated with stirring at 80 degrees C. for 3 hours, to which 13.7 parts by mass of Kyowado™ 500 was added as a neutralizing agent, stirred at room temperature for 2 hours, then, the solvent was removed at 100 degrees C. and 10 mmHg and, then, Kyowado™ 500 was filtrated off with a filter, NA-500, ex Advantech Co., Ltd., to obtain a product. The product was analyzed by $^1$H-NMR to find that it was represented by the following general formula:

$$Me-(Me_2SiO)_{30}-(MeBSiO)_3-(MePSiO)_1-(MeRSiO)_1-SiMe_3$$

wherein B is —$C_3H_6NH_2$, P is —$C_3H_6O(C_2H_4O)_9$—H, R is —$C_3H_6O(Me_2SiO)_{10}Bu$ and the bonding order of the parenthesized siloxane units is not limited.

$^1$H-NMR analysis also finds that the compound had no hydrosilyl group and the trimethylsilyl group was all removed. The each amount of octamethylcyclotetrasiloxane and decamethylcyclopentasiloxane was under the detection limit, i.e. 5 ppm, relative to a total mass of the product and an amount of the remaining platinum atom was 15 ppm or less, relative to a total mass of the product. Further, the product was analyzed by GC to find that the total amount of the cyclic siloxanes which were contained in the product and represented by $(Me_2SiO)_3(MeBSiO)_1$, $(Me_2SiO)_4(MeBSiO)_1$, $(Me_2SiO)_5(MeBSiO)_1$ or $(Me_2SiO)_6(MeBSiO)_1$, wherein B is —$C_3H_6NH_2$, was 10 ppm or less, that is, 0.001 part by mass or less, relative to 100 parts by mass of the product.

Example 8

55.5 Parts by mass of a bis(trimethylsilyl)allylamine represented by $CH2$=CH—$(CH_2)$-$NTMS_2$, 0.0333 part by mass of a solution of a complex of a chloroplatinic acid neutralized with sodium hydrogen carbonate and a vinyl siloxane in ethanol, containing 3.0 wt % of platinum, were added to 100 parts by mass of a hydrogensiloxane represented by a general formula: Me-$(Me_2SiO)_{30}$-$(MeHSiO)_5$—$SiMe_3$, and heated with stirring at 100 degrees C. for 4 hours. Then, 3.32 parts by mass of acetic acid and 100 parts by mass of isopropyl alcohol were added to the mixture and heated with stirring at 80 degrees C. for 3 hours, to which 27.4 parts by mass of Kyowado™ 500 was added as a neutralizing agent, stirred at room temperature for 2 hours, then, the solvent was removed at 100 degrees C. and 10 mmHg and, then, Kyowado™ 500 was filtrated off with a filter, NA-500, ex Advantech Co., Ltd., to obtain a product. The product was analyzed by $^1$H-NMR to find that it was represented by the following general formula:

$$Me-(Me_2SiC)_{30}(MeBSiO)_5-SiMe_3$$

wherein B is —$C_3H_6NH_2$ and the bonding order of the parenthesized siloxane units is not limited.

$^1$H-NMR analysis also finds that the compound had no hydrosilyl group and the trimethylsilyl group was all removed. The each amount of octamethylcyclotetrasiloxane and decamethylcyclopentasiloxane was under the detection limit, i.e. 5 ppm, relative to a total mass of the product and an amount of the remaining platinum atom was 15 ppm or less, relative to a total mass of the product.

Further, the product was analyzed by GC to find that the total amount of the cyclic siloxanes which were contained in the product and represented by $(Me_2SiO)_3(MeBSiO)_1$, $(Me_2SiO)_4(MeBSiO)_1$, $(Me_2SiO)_5(MeBSiO)_1$ or $(Me_2SiO)_6(MeBSiO)_1$, wherein B is —$C_3H_6NH_2$, was 10 ppm or less, that is, 0.001 part by mass or less, relative to 100 parts by mass of the product.

Comparative Example 1

20.17 Parts by mass of an allylpolyether represented by $CH_2=CH-(CH_2)-O-(C_2H_4O)_3-H$, 0.0167 part by mass of a solution of a complex of a chloroplatinic acid neutralized with sodium hydrogen carbonate and a vinyl siloxane in ethanol, containing 3.0 wt % of platinum, were added to 100 parts by mass of a hydrogensiloxane represented by a general formula: Me-$(Me_2SiO)_{30}$—$(MeHSiO)_5$-SiMe$_3$, and heated with stirring at 100 degrees C. for 2 hours. Then, 4.58 parts by mass of allylamine represented by $CH_2=CH-(CH_2)-NH_2$ and 0.0333 part by mass of a solution of a complex of a chloroplatinic acid neutralized with sodium hydrogen carbonate and a vinyl siloxane in ethanol, containing 3.0 wt % of platinum, were added to the reaction mixture and further heated with stirring at 100 degrees C. for 4 hours to obtain a product. The total amount of the catalyst used in the aforesaid reactions was such that an amount of the platinum metal was 0.0015 part by mass, relative to 100 parts by mass of the hydrogensiloxane. The product was analyzed by $^1$H-NMR to find that it was represented by the following general formula:

Me-$(Me_2SiO)_{30}$-$(MeHSiO)_2$-$(MePSiO)_3$-SiMe$_3$ wherein the bonding order of the parenthesized siloxane units is not limited.

The product was analyzed by $^1$H-NMR to find that the compound had unreacted hydrosilyl groups. This means that the addition reaction was prevented by the allylamine.

Comparative Example 2

The procedures of Comparative Example 1 were repeated to obtain a product except that the amount of a solution of a complex of a chloroplatinic acid neutralized with sodium hydrogen carbonate and a vinyl siloxane in ethanol, containing 3.0 wt % of platinum, was 0.6667 parts by mass. The total amount of the catalyst used in the aforesaid reactions was such that an amount of the platinum metal was 0.0205 part by mass, relative to 100 parts by mass of the hydrogensiloxane. The product was analyzed by $^1$H-NMR to find that it was represented by the following general formula:

Me-$(Me_2SiO)_{30}$-$(MeHSiO)_2$-$(MePSiO)_3$—SiMe$_3$ wherein the bonding order of the parenthesized siloxane units is not limited.

$^1$H-NMR analysis also finds that the compound had unreacted hydrosilyl groups. This means that the addition reaction was prevented by the allylamine.

As shown in Comparative Example 2, even when the amount of catalyst is increased in the method using the allylamine, the unreacted hydrosilyl group is remained in the product.

Comparative Example 3

1450 Parts by mass of octamethylcyclotetrasiloxane, 50 parts by mass of a hydrolysis product of 3-aminopropylm-ethyldimethoxysilane, 50 parts by mass of Me-$(Me_2SiO)_{11}$—SiMe$_3$, and 0.2 part by mass of potassium hydroxide were subjected to equilibration at 145 degrees C. for 5 hours. Then, the reaction mixture was cooled to 80 degrees C., 2 parts by mass of 2-chloroethanol was added and, then, the mixture was heated at 80 degrees C. for 2 hours. The volatile component was removed from the reaction product at 120 degrees C. and 35 mmHg for 3 hours to obtain a product. The product was analyzed by $^1$H-NMR to find that it was represented by the following general formula:

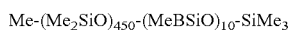

Me-$(Me_2SiO)_{450}$-$(MeBSiO)_{10}$-SiMe$_3$ wherein B is —$C_3H_6NH_2$ and the bonding order of the parenthesized siloxane units is not limited.

The product was analyzed by GC to find that the total amount of the cyclic siloxanes, which were contained in the product and represented by $(Me_2SiO)_3(MeBSiO)_1$, $(Me_2SiO)_4(MeBSiO)_1$, $(Me_2SiO)_5(MeBSiO)_1$ or $(Me_2SiO)_6(MeBSiO)_1$, wherein B was —$C_3H_6NH_2$, was more than 10,000 ppm, that is, more than 1 part by mass, relative to 100 parts by mass of the product.

Comparative Example 4

222 Parts by mass of octamethylcyclotetrasiloxane, 352 parts by mass of a hydrolysis product of 3-aminopropylm-ethyldimethoxysilane, 50 parts by mass of Me-$(Me_2SiO)_{28}$-$(MePSiO)_3$-SiMe$_3$, wherein P is —$C_3H_6O\,(C_2H_4O)_3H$, and 1.7 parts by mass of tetra-n-butylphosphonium hydroxide were subjected to equilibration at 120 degrees C. for 6 hours. Then, the reaction mixture was further heated at 160 degrees C. for 3 hours and the volatile component was removed from the reaction product at 120 degrees C. and 35 mmHg for 3 hours to obtain a product. The product obtained was gel and not a desired one.

Comparative Example 5

2,002 Parts by mass of octamethylcyclotetrasiloxane, 469 parts by mass of a hydrolysis product of 3-aminopropylm-ethyldimethoxysilane, 1,001 parts by mass of Me-$(Me_2SiO)_4$-$(MePSiO)$-SiMe$_3$, wherein P is —$C_3H_6O\,(C_2H_4O)_{11}$Me, and 10.4 parts by mass of tetra-n-butylphosphonium hydroxide were subjected to equilibration at 120 degrees C. for 6 hours. Then, the reaction mixture was further heated at 160 degrees C. for 3 hours and the volatile component was removed from the reaction product at 120 degrees C. and 35 mmHg for 3 hours to obtain a product. The product was analyzed by $^1$H-NMR to find that it was represented by the following general formula:

Me-$(Me_2SiO)_{31}$-$(MeBSiO)_4$-$(MePSiO)_1$—SiMe$_3$ wherein B is —$C_3H_6NH_2$, p is —$C_3H_6O(C_2H_4O)_{11}$Me and the bonding order of the parenthesized siloxane units is not limited. The product was analyzed by GC to find that the total amount of the cyclic siloxanes contained in the product, which were contained in the product and represented by $(Me_2SiO)_3(MeBSiO)_1$, $(Me_2SiO)_4(MeBSiO)_1$, $(Me_2SiO)_5(MeBSiO)_1$ or $(Me_2SiO)_6(MeBSiO)_1$, wherein B was —$C_3H_6NH_2$, was more than 10,000 ppm, that is, more than 1 part by mass, relative to 100 parts by mass of the product.

As shown in Examples 1 to 8, the addition reaction is not prevented in the present method. Even when an amount of the catalyst is small, the addition reaction proceeds sufficiently not to leave the hydrosilyl group unreacted. Further, an amount of an impurity contained in a product obtained, such as octamethylcyclotetrasiloxane, decamethylcyclopentasiloxane, $(Me_2SiO)_3(MeBSiO)_1$, $(Me_2SiO)_4(MeBSiO)_1$, $(Me_2SiO)_5(MeBSiO)_1$ and $(Me_2SiO)_6(MeBSiO)_1$, wherein B is —$C_3H_6NH_2$, is decreased to 1000 ppm or less, that is 0.1 part by mass or less, relative to 100 parts by mass of a product.

INDUSTRIAL APPLICABILITY

According to the present method, the aminoalkyl group-containing siloxane, in particular the aminoalkyl group- and polyoxyalkylene group-containing siloxane is efficiently provided and the amount of a cyclic siloxane as an impurity contained in the siloxane is decreased. Further, a compound having a polyether chain having a hydroxyl group at the terminal or even having a terminal capped with an alkyl group can be prepared. The aminoalkyl group-containing siloxane and the aminoalkyl group and polyoxyalkylene group-containing siloxane are usable as a component in cosmetics, as fiber treatment agents, water-repellent agents, oil-repellent agents, mold release agents and additives for painting materials.

The invention claimed is:

1. A method for preparing an aminoalkyl group-containing siloxane represented by the following general formula (1):

$$(R^1{}_3SiO_{1/2})_k(R^1{}_2SiO_{2/2})_p(R^1{}_1SiO_{3/2})_q(SiO_{4/2})_r \quad (1)$$

wherein $R^1$ is, independently of each other, a hydroxyl group, a substituted or unsubstituted monovalent hydrocarbon group having 1 to 20 carbon atoms, or a group represented by the following formula (2) or (3), provided that at least one of $R^1$ is the group represented by the following formula (2), k, p, q and r are, independently of each other, an integer of 0 or more, provided that a total of k, p, q and r is larger than zero, and a bonding order of the parenthesized siloxane units is not limited;

$$—(CR^2H)_a—(NHCH_2CH_2)_b—NH_2 \quad (2)$$

wherein a is an integer of from 2 to 11, b is an integer of from 0 to 10, and $R^2$ is, independently of each other, a hydrogen atom or an unsubstituted monovalent hydrocarbon group having 1 to 20 carbon atoms;

$$—(CR^2H)_c—O—(C_2H_4O)_d—(C_3H_6O)_e—R^3 \quad (3)$$

wherein c is an integer of from 2 to 11, d is an integer of from 0 to 100, e is an integer of from 0 to 100, a total of d and e is larger than zero, $R^2$ is as defined above, $R^3$ is an unsubstituted monovalent hydrocarbon group having 1 to 20 carbon atoms, a hydrogen atom or —$COR^4$, wherein $R^4$ is an unsubstituted monovalent hydrocarbon group having 1 to 20 carbon atoms;

comprising a step of addition reacting the following compound (A) with the following compound (B) and optionally the following compound (C), (A) a hydrogensiloxane represented by the following general formula (9):

$$(R^8{}_3SiO_{1/2})_k(R^8{}_2SiO_{2/2})_p(R^8{}_1SiO_{3/2})_q(SiO_{4/2})_r \quad (9)$$

wherein $R^8$ is, independently of each other, a hydrogen atom, a hydroxyl group, or a substituted or unsubstituted monovalent hydrocarbon group having 1 to 20 carbon atoms, provided that at least one of $R^8$ is a hydrogen atom, k, p, q and r are as defined above and a bonding order of the parenthesized siloxane units is not limited;

(B) a compound represented by the following formula (10) and having a protected amino group:

$$CHR^2=CR^2—(CR^2H)_{a'}—(NQCH_2CH_2)_b—NQ_2 \quad (10)$$

wherein a' is "a" minus 2, b and $R^2$ are as defined above, Q is a silyl group represented by —$SiR^9{}_3$, wherein $R^9$ is, independently of each other, an unsubstituted monovalent hydrocarbon group having 1 to 20 carbon atoms;

(C) a polyether represented by the following formula (11):

$$CHR^2=CR^2—(CR^2H)_{c'}—O—(C_2H_4O)_d—(C_3H_6O)_eR^3 \quad (11)$$

wherein c' is c minus 2 and d, e, $R^2$ and $R^3$ are as defined above, and, then a step of detaching the silyl group from the amino group, hereinafter referred to as deprotection, to thereby provide said aminoalkyl group-containing siloxane represented by the formula (1), wherein an amount of a cyclic siloxane represented by the following formula (4):

$$(SiBMeO)_m(SiMe_2O)_n \quad (4)$$

wherein m is an integer of 1 or 2, n is an integer of from 3 to 20 and B is the group represented by the aforesaid formula (2), as an impurity in the aminoalkyl group-containing siloxane obtained by the deprotection is 0 to 1 part by mass, relative to 100 parts by mass of the aminoalkyl group-containing siloxane.

2. The method according to claim 1, wherein the aminoalkyl group-containing siloxane (1) is represented by the following formula (5):

$$R^6—(R^7{}_2SiO)_x—(R^7BSiO)_y—(R^7PSiO)_z—SiR^7{}_2R^6 \quad (5)$$

wherein $R^6$ is, independently of each other, a hydroxyl group, a substituted or unsubstituted monovalent hydrocarbon group having 1 to 20 carbon atoms, or a group represented by the aforesaid formula (2) or (3), $R^7$ is, independently of each other, a hydroxyl group, a substituted or unsubstituted monovalent hydrocarbon group having 1 to 20 carbon atoms, or a group represented by the following formula (7):

$$—O—(R^5{}_2SiO)_t—SiR^5{}_3 \quad (7)$$

wherein $R^5$ is as defined above and t is an integer of from 0 to 1000;

B is a group represented by the aforesaid formula (2), P is a group represented by the aforesaid formula (3), x, y, and z are, independently of each other, an integer of from 0 to 2000, a total of x, y and z is larger than zero, at least one of $R^6$ is the group represented by the aforesaid formula (2) when y is zero, and a bonding order of the parenthesized siloxane units is not limited; and hydrogensiloxane (A) is compound (A') represented by the following general formula (13):

$$(A') \ R^{11}—(R^{10}{}_2SiO)_y—SiR^{11}{}_3 \quad (13),$$

wherein $R^{11}$ is, independently of each other, a hydrogen atom, a hydroxyl group, or a substituted or unsubstituted monovalent hydrocarbon group having 1 to 20 carbon atoms, $R^{10}$ is, independently of each other, a hydrogen atom, a hydroxyl group, a substituted or unsubstituted monovalent hydrocarbon group having 1 to 20 carbon atoms, or the group represented by the aforesaid formula (7), provided 3. The method according to claim 1 or 2, wherein the addition reaction is conducted in the presence of a metal catalyst in such an amount that an amount of metal is 0.02 part by mass or less, relative to 100 parts by mass of compound (A) or (A').

4. The method according to claim 1, wherein the aminoalkyl group-containing siloxane obtained by the deprotection contains substantively no silazane.

5. The method according to claim 1, wherein the aminoalkyl group-containing siloxane obtained by the deprotection contains substantively no compound having a hydrosilyl group.

6. The method according to claim 1, wherein the aminoalkyl group-containing siloxane has at least one group represented by the aforesaid formula (3).

7. The method according to claim 1, wherein an amount of a cyclic siloxane represented by the following formula (8):

$$(SiHMeO)_m(SiMe_2O)_n \qquad (8)$$

wherein m is an integer of from 0 to 4 and n is an integer of from 3 to 20, contained in hydrogensiloxane (A) or (A') to be subjected to the addition reaction is 0 to 1 part by mass, relative to 100 parts by mass of the hydrogensiloxane.

8. An aminoalkyl group-containing siloxane represented by the following general formula (1):

$$(R^1{}_3SiO_{1/2})_k(R^1{}_2SiO_{2/2})_p(R^1{}_1SiO_{3/2})_q(SiO_{4/2})_r \qquad (1)$$

wherein $R^1$ is, independently of each other, a hydroxyl group, a substituted or unsubstituted monovalent hydrocarbon group having 1 to 20 carbon atoms, or a group represented by the following formula (2) or (3), provided that at least one of $R^1$ is the group represented by the following formula (2), k, p, q and r are, independently of each other, an integer of 0 or more, provided that a total of k, p, q, and r is larger than zero, and a bonding order of the parenthesized siloxane units is not limited, $$(CR^2H)_a-(NHCH_2CH_2)_b-NH_2 \qquad (2)$$

wherein a is an integer of from 2 to 11, b is an integer of from 0 to 10, and $R^2$ is, independently of each other, a hydrogen atom or an unsubstituted monovalent hydrocarbon group having 1 to 20 carbon atoms;

$$-(CR^2H)_c-O-(C_2H_4O)_d-(C_3H_6O)_e-R^3 \qquad (3)$$

wherein c is an integer of from 2 to 11, d is an integer of from 0 to 100, e is an integer of from 0 to 100, a total of d and e is larger than zero, $R^2$ is as defined above, $R^3$ is an unsubstituted monovalent hydrocarbon group having 1 to 20 carbon atoms, a hydrogen atom or $-COR^4$, wherein $R^4$ is an unsubstituted monovalent hydrocarbon group having 1 to 20 carbon atoms;

wherein an amount of a cyclic siloxane represented by the following formula (4):

$$(SiBMeO)_m(SiMe_2O)_n \qquad (4)$$

wherein m is an integer of 1 or 2, n is an integer of from 3 to 20, and B is the group represented by the aforesaid formula (2), contained as an impurity in the aminoalkyl group-containing siloxane is 0 to 1 part by mass, relative to 100 parts by mass of the aminoalkyl group-containing siloxane.

9. The aminoalkyl group-containing siloxane according to claim 8, represented by the following formula (5):

$$R^6-(R^7{}_2SiO)_x-(R^7BSiO)_y-(R^7PSiO)_z-SiR^7{}_2R^6 \qquad (5)$$

wherein $R^6$ is, independently of each other, a hydroxyl group, a substituted or unsubstituted monovalent hydrocarbon group having 1 to 20 carbon atoms, or a group represented by the aforesaid formula (2) or (3), $R^7$ is, independently of each other, a hydroxyl group, a substituted or unsubstituted monovalent hydrocarbon group having 1 to 20 carbon atoms, or a group represented by the following formula (7):

$$-O-(R^5{}_2SiO)_t-SiR^5{}_3 \qquad (7)$$

wherein $R^5$ is as defined above and t is an integer of from 0 to 1000;

B is the group represented by the aforesaid formula (2), P is the group represented by the aforesaid formula (3), x, y, and z are, independently of each other, an integer of from 0 to 2000, a total of x, y and z is larger than zero, at least one of $R^6$ is the group represented by the aforesaid formula (2) when y is zero, and a bonding order of the parenthesized siloxane units is not limited.

10. The aminoalkyl group-containing siloxane according to claim 8 or 9, having at least one group represented by the aforesaid formula (3).

11. The method according to claim 1, wherein the amount of the cyclic siloxane represented by the formula (4) is 0.1 part by mass or less to zero part by mass, relative to 100 parts by mass of the aminoalkyl group-containing siloxane.

12. The aminoalkyl group-containing siloxane according to claim 8, wherein the amount of the cyclic siloxane represented by the formula (4) is 0.1 part by mass or less to zero part by mass, relative to 100 parts by mass of the aminoalkyl group-containing siloxane.

* * * * *